J. KELLY.
SCALE.
No. 14,361.  Patented Mar. 4, 1856.
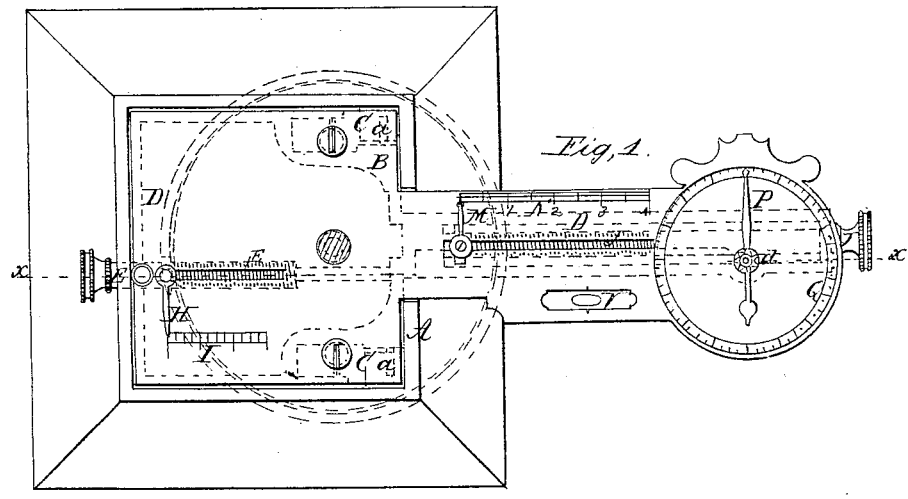
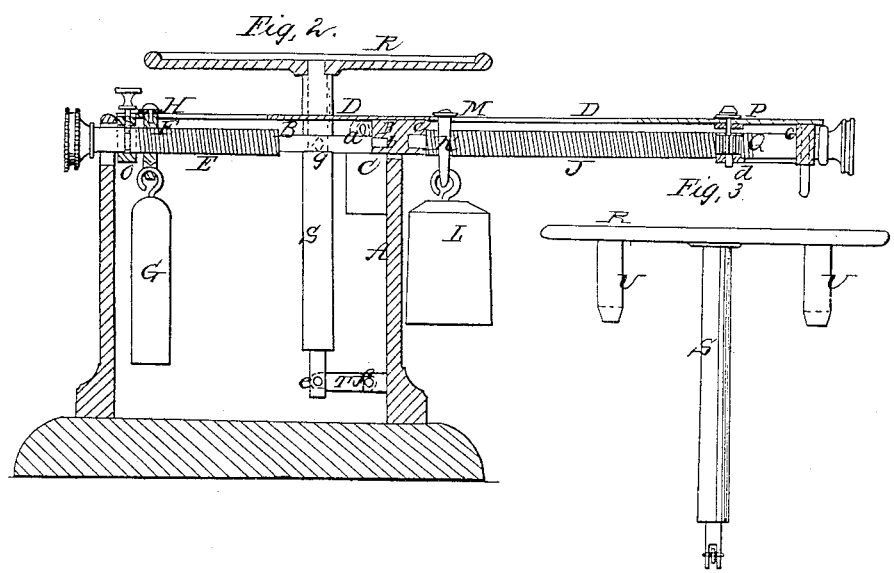

UNITED STATES PATENT OFFICE.

JAS. KELLY, OF SAG HARBOR, NEW YORK.

WEIGHING-SCALE.

Specification of Letters Patent No. 14,361, dated March 4, 1856.

*To all whom it may concern:*

Be it known that I, JAMES KELLY, of Sag Harbor, in the county of Suffolk and State of New York, have invented a new and useful Improvement in the Construction of Scales or Weighing Apparatuses; and I do hereby declare that the following is a full, clear, and exact description of the same, reference being had to the annexed drawings, making a part of this specification, in which—

Figure 1, is a plan or top view of my improvement. Fig. 2, is a vertical section of ditto, (*x*), (*x*), Fig. 1, showing the plane of section. Fig. 3, is a detached side view of the dish or basin on which articles to be weighed are placed.

Similar letters of reference indicate corresponding parts in the several figures.

A, represents a rectangular box having a metallic frame B, in its upper part, the frame B, having knife edged arms (*a*), (*a*), attached to it at opposite sides which arms rest upon projections C. C. on the inner side of the box. To the upper surface of the frame B, a metallic plate D, is attached.

E, is a screw rod, which has its bearings (*b*), (*b*), in the frame B. This rod E, has a nut F, upon it to the lower end of which a weight G, is attached, to the upper end of the nut an index H, is attached which index works over a graduated scale I, on the upper surface of the plate D.

J, is a screw rod the inner end of which is fitted in the frame B, and the outer end is fitted in a bearing (*c*), attached to the under side of the plate D, the plate D, extending the whole length of the screw rod J.

K, is a nut which is fitted on the screw rod J. The lower end of this nut has a weight L, attached to it and the upper end has an index M, attached to it, which index works over a graduated scale N, on the upper surface of the plate D.

O, is a worm wheel into which the screw rod J, gears. The axis (*d*), of this worm wheel projects above the plate D, and has an index P, on its upper end, said index working over a graduated circle Q, on the plate D. The circle Q, is graduated into ounces and parts thereof. The scale N, is graduated into lbs., and the scale I, is graduated into the fractional parts of lbs.

The screw rods J, and E, frame B, and plate D, may be considered as the beam of the scales, and the arms (*a*), (*a*), the bearings or fulcrum of the beam.

R, represents the dish or basin on which the articles to be weighed are placed. This dish or basin has a rod S, attached to the center of its underside. The rod S, passes through the plate D, and its lower end is attached by a pivot (*e*), to a link T, which is attached by a pivot (*f*), to a projection on the inner side of the box A, at its lower part. There are also two rods U, U, attached to the underside of the dish or basin. The lower ends of these rods have V-shaped notches cut in them which notches fit over knift edged projections (*g*), on the upper side of the frame B.

Operation: When the indexes H, M, P, are at the 0 or zero marks, the frame B, will be perfectly balanced on the arms (*a*), (*a*). The article to be weighed is placed upon the dish or basin R, and the screw rod J, is turned by hand till the weight L, is brought out sufficiently far from the arms or fulcrum of the beam to counterbalance the article in the dish or basin R. The index M, will show the weight of the article in pounds, and the index P, will show the fractional parts of a pound, oz., half and quarter oz., etc. If the article to be weighed is to be placed in a dish or vessel, it, the dish or vessel, is placed upon the basin R, and counterbalanced by turning the rod E, which will cause the weight and nut F, G, to be moved nearer the fulcrum of the beam. This adjustment of the tare weight (G) and gross weight (L) from fixed points or distances at opposite ends of the beam affords great facility in setting, previous to weighing, those scales of moderate size and which have the two ends of the beam within convenient reach of the right and left hands of the operator as both weights may be moved to the 0 or zero marks simultaneously and without varying the stretch of the hands apart or affecting, by either adjustment, the determinate character of the beam whose length remains stationary, while in thus simultaneously adjusting the two weights by turning the two screws (E and J) at opposite ends of the beam, lateral pressure on the fulcrum or rather shake or play of the beam, horizontally as well as vertically, producing temporary or permanent disturbance, is considerably lessened or removed by the steadying of the beam at both ends in effecting the two adjustments.

I am aware that scales have been provided with a sliding tare weight on one end of the beam and a sliding gross weight at the other with the latter end or portion made adjustable by sliding devices that shortened or lengthened the leverage; also that a fixed leverage in beam scales is old; and that the mere indication of the weight by screw adjustment is not new; none of such therefore do I claim. But What I do claim as new and useful in beam balances or scales, and desire to secure by Letters Patent, is—

The arrangement substantially as herein shown and described of the two screws (E and J) with, at opposite ends, and forming part of the double beam (B, D,) in combination with the nuts (F K) and weights (G L), all constructed and operating together essentially as set forth, for the separate and simultaneously adjacent of the tare and gross weights from fixed points or distances at opposite ends of the beam in manner and for the purposes described.

JAMES KELLY.

Witnesses:
ISAAC SCHOLFIELD,
JAMES KELLY.